July 3, 1956 S. A. HERRES ET AL 2,753,262

PROCESS OF COMPACTING AND SINTERING TITANIUM METAL SCRAP

Filed June 27, 1952 2 Sheets-Sheet 1

INVENTORS
Schuyler A. Herres &
Raymond L. Southern.
BY
James N. Ely
ATTORNEY

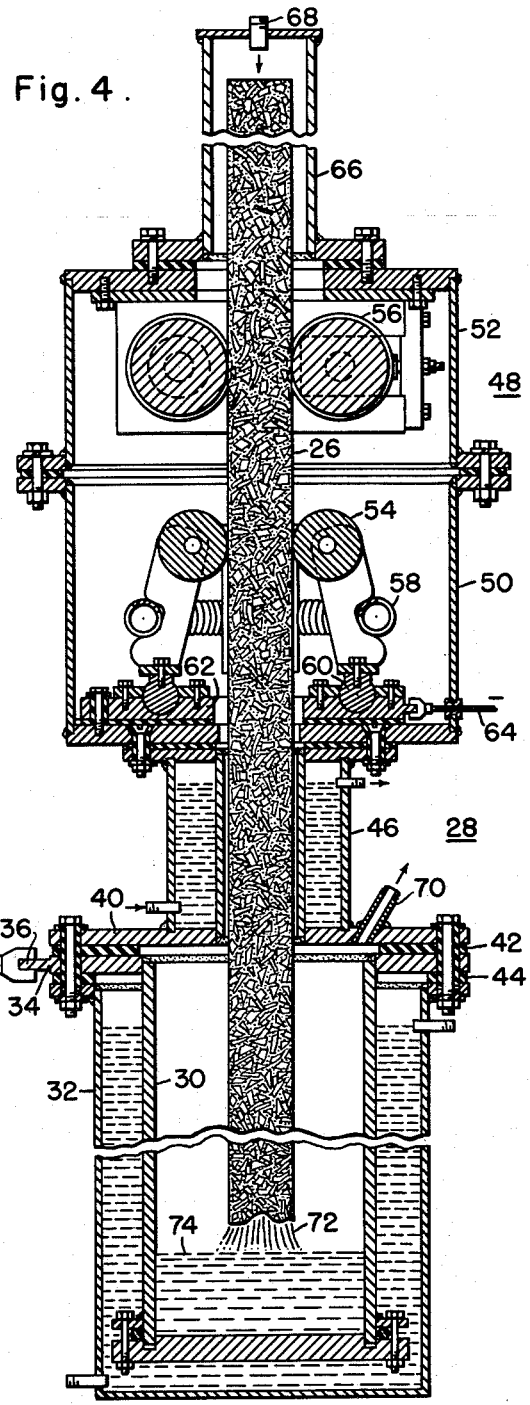

United States Patent Office 2,753,262
Patented July 3, 1956

2,753,262
PROCESS OF COMPACTING AND SINTERING TITANIUM METAL SCRAP

Schuyler A. Herres, Albany, and Raymond L. Southern, Troy, N. Y., assignors to Allegheny Ludlum Steel Corporation, Brackenridge, Pa., a corporation of Pennsylvania Application June 27, 1952, Serial No. 295,992

2 Claims. (Cl. 75—226)

This invention relates to the making of titanium base alloys and in particular to the utilization of scrap titanium base metal in making titanium base alloys.

Industry has only recently attempted to make titanium base alloys in commercial lots. As yet considerable experimentation is being performed in order to produce such titanium base alloys at a commercially feasible price. Numerous problems have arisen and while some have been solved, a considerable number of problems remain to challenge the industry.

One of the problems found in the making of titanium base alloys is the question of disposal of scrap metal such as scrap sheet, bars, turnings, scrap electrode tips, and the like, which scrap has rapidly accumulated in stockpiles with those few companies now conducting investigations on titainum base alloys. One company is reported to have a stockpile of over 60,000 pounds of scrap metal for which there is no commercial use. In addition, in making sponge titanium, the sponge metal is crushed to facilitate the formation of the sponge into electrode shapes. However, in crushing the sponge a tough core always remains which it is impossible to crush. These tough cores of sponge have also represented a source of waste metal, since it has heretofore been commercially impossible to recover the metal thereof. Such scrap and core material represents a considerable investment and is a factor in the high price of the few titanium base alloys now commercially available.

Numerous attempts have been made to reclaim the scrap metal resulting from the making of titanium base alloys but such attempts have not as yet been commercially successful. As an example of one of the attempts made heretofore, efforts have been made to combine certain of the scrap metal with titanium sponge in the making of consumable electrodes by forming hollow electrodes of sponge sticks, which hollow electrodes are then filled with turnings and other forms of scrap titanium metal. Where such an electrode is utilized as a consumable electrode it is found that the scrap metal does not sinter successfully from the heat of the melt to maintain the scrap in position in the hollow electrode with the result that the scrap metal drops out of the electrode into the pool of molten metal resulting in an inferior ingot that is not homogeneous as to composition. Other attempts have been made to utilize the scrap by combining it with sponge metal and pressing the resulting mixture into the form of electrodes, but in such case it is found that at least 75% of the sponge metal must be employed in conjunction with the scrap metal in order to make a compact electrode which will hold together sufficiently to facilitate its use as an electrode. This latter processing is inefficient because of the large quantities of sponge metal necessary to reclaim a very small part of the scrap metal on hand.

An object of this invention is to provide for utilizing scrap titanium base metal in producing titanium base alloys.

Another object of this invention is to provide for recovering scrap titanium base metal and utilizing it in the form of consumable electrodes in producing titanium base alloys.

A further object of this invention is to provide a process for utilizing scrap titanium base metals in producing ferro-titanium alloy of a high degree of purity.

Another object of this invention is to provide a consumable electrode of scrap titanium base metal for the making of titanium base alloy.

Other objects of this invention will become apparent from the following description when taken in conjunction with the following drawings in which, Fig. 1 is a view in elevation with a part broken away of an assembly incorporating scrap titanium base metal as utilized in the teachings of this invention.

Fig. 4 is a sectional elevation view of representative melting apparatus utilized in effecting the melting of the assembly of Figs. 2 or 3 to form a titanium base alloy.

In accordance with this invention pieces of scrap titanium base alloy are graded according to composition and after being so graded are subjected to a degreasing process for removing the grease therefrom. If the scrap comprises turnings, the turnings are preferably subjected to the action of a magnetic separator to insure the removal of any iron turnings therein and to leave only the titanium alloy. It is possible in some cases that it may be desirable to caustic pickle the scrap metal to effect a descaling and cleaning thereof. In any event, the scrap metal formed of turnings, scrap sheet, bars, electrode scrap, sponge metal scrap, or the like, is thoroughly cleaned to remove the grease therefrom. As such degreasing and pickling operations are well known in the art, they will not be referred to specifically herein as the particular steps of the degreasing forms no part of this invention.

Figure 1:
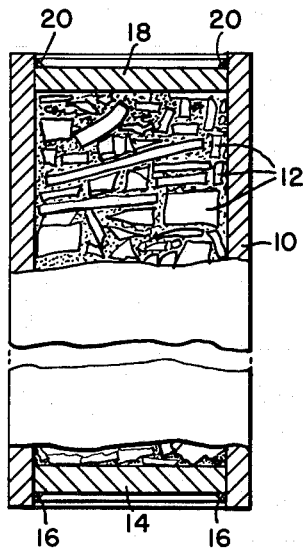
Figure 2:
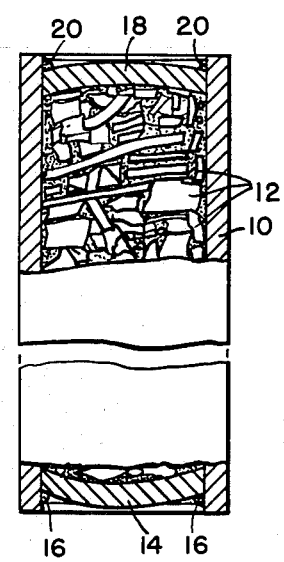
Fig. 2 is a view in elevation with a part broken away of the assembly of Fig. 1 compacted and sintered in accordance with the teachings of this invention.

In order to provide a container for holding the pieces of scrap metal which have been cleaned, a steel pipe 10 as illustrated in Figs. 1 and 2 of the drawing is employed. The steel pipe may be of any diameter and length depending upon the size of the electrode which it is desired to produce and may range anywhere from 1¼ inches diameter up to as high as 20 inches in diameter. The length is only dependent on the length of electrode which can be employed in the melting equipment to be referred to hereinafter, lengths of 12 feet having been successfully employed. Generally speaking, such pipe 10 will have a wall thickness of from ⅛ to ½ inch and preferably in the neighborhood of ¼ inch so that the pipe will not rupture when worked as to be described hereinafter. As in the case of the pieces 12 of the scrap metal, the pipe 10 is thoroughly cleaned so as to insure the absence of grease therefrom.

In accordance with the teachings of this invention one end of the pipe 10 is provided with an end cap 14 having a thickness substantially that or greater than the thickness of the wall of the pipe 10, the end cap 14 being inserted in the end of pipe 10 and securely welded as at 16 about its periphery to the inner wall of pipe 10. The pipe 10 is then filled with pieces 12 of the scrap titanium base metal, these pieces ranging anywhere in size from powder for crushed scrap and turnings up to pieces having a size equivalent to the inside diameter of the pipe 10. Where desired, additional alloying components in predetermined amounts can be added and mixed with the pieces of scrap metal in filling the pipe 10 to produce alloys having predetermined composition. As the pieces 12 are placed in the pipe 10 they preferably comprise a mixed size of scrap and crushed sponge metal with or without additional alloying elements so that the small pieces and crushed sponge titanium metal will filter into and fill the spaces between the larger pieces of scrap and substantially fill the pipe 10. Where desired pieces of scrap rod are placed longitudinal of the pipe 10 to function as reinforcing and stiffening elements for the resulting compact. The tough core members remaining after crushing sponge titanium may also be included as the core of the filler in the pipe 10. When the pipe 10 is filled in this manner it is found that so little air is entrapped among the pieces 12 of scrap within the pipe 10 that such entrapped air is insufficient to later contaminate the resulting electrode or the melt formed therefrom. After the pipe 10 is thus filled another end cap 18 which is substantially identical to the end cap 14, being of steel having a composition similar to that of the pipe 10, is inserted in the pipe and welded as at 20 to close the other end of the pipe 10.

When the pipe 10 is filled and sealed as by means of end caps 14 and 18 as just described, it is heated to a temperature of 1700° F. to 1950° F. preparatory to compacting the assembly into a predetermined shape and size. In practice it is found that a minimum temperature of 1700° F. is necessary for permitting working of the scrap and effecting sintering as to be described hereinafter, whereas the maximum temperature of 1950° F. must not be exceeded as otherwise a eutectic alloy is formed between the scrap metal and the steel sheath which will have a lower melting point than that of either the pipe or scrap with the result that the pipe is melted with a resulting contamination of the composition of the scrap.

The heated assembly is then subjected to a compacting operation obtained by working the heated filled pipe as by pressure hammering or rolling to effectively compact the pieces 12 within the tube 10, the tube 10 being correspondingly deformed and functioning as a sheath to maintain the pieces 12 within the sheath or pipe 10. In working the assembly comprising the filled pipe 10 containing the pieces 12 of titanium base metal therein, the assembly may be given any predetermined shape such as a round shape, rectangular shape, or a polygon shape, depending upon the resultant shape it is desired to have in the electrode. When working is applied to the filled pipe 10 to effect the compacting of the miscellaneous sized pieces 12 of titanium base metal, it is found that, under such compacting action, a sintering of the heated pieces 12 is effected simultaneously with the compacting, the sintering being so thorough that the pieces 12 are sintered into an integral, self-sustaining unit substantially free of voids. In such cases the pipe 10 is often elongated to a slight degree with resulting bulging of the end pieces 14 and 18, as illustrated in Fig. 2, the end pieces, however, functioning to retain the pieces 12 within the pipe 10 under such compacting action.

In practicing this invention, the pipe 10 is preferably of steel having a carbon content of not over 0.10% as in some cases, such as in the production of ferro-titanium, it is desirable to utilize the compacted assembly of Fig. 2 as the consumable electrode. However, in other cases where it is desirable to produce a titanium base alloy substantially free of iron, the pipe or sheath 10 is removed from the sintered mass formed of the pieces 12 and in such cases the carbon content of the pipe 10 forming the sheath is not critical. An examination of the compacted mass within pipe 10 reveals that the mass of sintered pieces 12 of scrap are sufficiently sintered to the inner wall of the pipe 10 to prevent drop out of the sintered mass of scrap pieces 12 when the assembly of Fig. 2 is utilized as a consumable electrode in making ferro-titanium alloys. However, such adherence of the sintered mass of scrap pieces 12 to the inner wall of the pipe 10 is insufficient to prevent the removal of the sheath formed by the pipe 10 from the sintered mass. Such removal can be readily accomplished by cutting through the end caps or pieces 14 and 18 and lengthwise along the sheath or pipe 10, preferably along opposite edges in the case of a rectangular or other shape edged mass, and thereafter prying the cut pipe and end caps from the sintered mass resulting in the integral unit 22 of Fig. 3. This integral unit formed only of the compacted and sintered mass of pieces 12 of scrap metal is substantially free of voids and is provided with a relatively symmetrical outer surface 24 for receiving sliding or rolling electrical contact members as will be described hereinafter.

Figure 3:
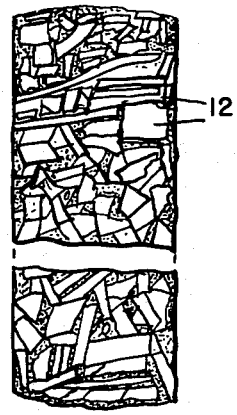
Fig. 3 is a view in elevation of the compacted and sintered assembly of Fig. 2 with the sheath removed therefrom.

With the consumable electrode formed as described hereinbefore and in the form of either Figs. 2 or 3, depending upon whether the resulting titanium base alloy is to contain iron or is to be substantially iron free, the electrode, hereinafter referred to by the numeral 26, is automatically fed to an arc-melting crucible of any of the known types. Referring to Fig. 4 of the drawing, a representative arc-melting apparatus 28 is illustrated which is satisfactory for employing the electrodes 26 formed in accordance with this invention. The arc-melting equipment illustrated in Fig. 4 is of the type described and claimed in the copending application Serial No. 211,887, filed February 20, 1951, now Patent No. 2,666,104, dated December 8, 1953 in the name of R. L. Southern and assigned to the assignee of this invention. The specific arc-melting equipment illustrated for effecting the melting of electrode 26 forms no part of this invention and will therefore be described only generally.

In general the arc-melting equipment 28 of Fig. 4 comprises an arc-melting crucible 30 formed of copper or the like and which is provided with an outer water cooling jacket 32 to aid with the solidification of molten metal by extracting heat therefrom. The crucible 30 is provided with an upper outwardly extending flange 34 of highly conductive metal such as copper which carries a lug 36 to which a conductor 38 is disposed to be connected. A cover 40 is provided for the crucible 30, the flange 34 being insulated from the cover 40 and from the water jacket 32 by means of heat resisting insulating gaskets 42 and 44, respectively. The cover 40 carries a vertically extending water jacket 46 through which the electrode 26 is disposed to be downwardly fed, the water jacket 46 functioning to insulate the apparatus above the crucible 30 from the heat of the crucible.

As illustrated, an upper housing 48 formed of a lower section 50 and an upper section 52 is disposed to seat on the vertical water jacket 46 and to contain electrical contact members 54 and feed rolls 56, respectively. The electrical contact members 54 may be of any predetermined design for engaging the side walls of the electrode 26 and are preferably spring biased as by means of a spring 58 into contact making engagement with the outer surface 24 of the electrode 26. The electrical contact members 54 are connected through an electrical conducting ball joint 60 and an annular member 62 of conducting metal to a conductor 64 which is connected to a suitable source of direct current energy (not shown). Preferably the conductor 64 is of negative polarity, whereas the conductor 36 is of positive polarity.

The feed rolls 56 may be of any suitable design and the speed of rotation thereof is preferably controlled by a mechanism (not shown) which is responsive to variations in the arc voltage utilized in the melting of the consumable electrode 26. Such voltage responsive mechanisms are well known to the electrical industry and need not be described herein. Thus the rate of feed of the electrode 26 will be controlled to maintain a substantially constant arc at the tip of the electrode 26.

In the embodiment of the arc-melting equipment illustrated, the housing 48 carries another housing 66 which is of a size suitable for enclosing the end of the electrode 26. The housings 48 and 66 are so assembled with suitable heat resisting gaskets as illustrated so that the entire assembly when mounted on the arc melting crucible 30 will be substantially leak proof, although a gas inlet 68 is illustrated as provided at the upper end of the housing 66 and a gas outlet 70 is illustrated as being in communication with the crucible 30.

With the electrode 26 mounted in the assembly and inlet 68 closed by any suitable means (not shown), the crucible 30 is evacuated by suitable vacuum pumps (not shown) attached to the outlet 70 of the crucible 30. The inlet 68 is then connected to a source of supply of inert gas such as argon, helium or neon for supplying an inert gas to the evacuated assembly and the outlet 70 is freed from the vacuum pumping equipment (not shown) so that the inert gas will flow downwardly from the inlet 68 about the electrode 26, into the crucible 30 and escape through the outlet 70 into the atmosphere. Thus the more readily volatilizable impurities are swept downwardly in the assembly at a faster rate than the normal rate of feed of the electrode 26 and impurities are prevented from collecting on the feed rolls 56 to cause damage to the bearings thereof. In addition, the flow of the inert gas downwardly in the assembly effectively cools the electrical contact members 54 and tends to cooperate with the water jacket 46 to prevent any appreciable furnace heat from rising from the crucible 30 into the housing 48.

When the conductors 38 and 64 are connected to a source (not shown) of direct current, an arc 72 is established between the tip of the electrode 26 with a starting charge of metal or with previously melted metal 74 to effectively melt the electrode 26 and build up an ingot of the titanium base alloy in the crucible 30, the composition of the ingot being dependent upon the composition of the selected grade of scrap metal employed in the making of the consumable electrode 26.

The process and electrodes of this invention are quite efficient in the production of titanium base alloys of predetermined composition. Provision is thus made for a very efficient reclaiming of scrap metal which will effect considerable economies in the manufacture of titanium base alloys over the practice of the industry as heretofore employed. The alloys produced by utilizing such scrap metal processed as described have compositions which can be readily predicted and which are of a high degree of purity.

Ferro-titanium alloys are efficiently produced by utilizing the electrode of Fig. 2 having the sheath or pipe 10 of steel intact with the compacted mass of sintered scrap titanium metal pieces therein as the consumable electrode in forming ingots. When such ingots are crushed and analyzed, the alloy is found to have an iron content of 19 to 60% with carbon less than .055% depending upon the thickness of the metal sheath 10 employed or the iron and other desired additions initially incorporated in the compact. Such resulting ferro-titanium compositions have much lower melting points and a higher degree of purity than the standard 40% ferro-titanium which is generally used by the trade.

Ingots of up to 350 pounds have been successfully made from reclaimed scrap metal in accordance with the teachings of this invention. It is conceivable that considerably larger ingots can be produced from reclaimed scrap titanium base alloys since the only limitation at the present time in following the teachings of this invention is the size of the melting equipment which can be utilized.

What is claimed is:
1. In the process of making an electrode for use as a consumable electrode in making titanium base alloy, the steps comprising, positioning pieces of scrap titanium base metal in rod form longitudinally within a steel pipe, filling the steel pipe with pieces of scrap titanium base metal of mixed size, sealing the filled pipe from the atmosphere, heating the filled pipe to a temperature of 1700° F. to 1950° F., and working the filled pipe while at the temperature of 1700° F. to 1950° F. to compact the scrap pieces and effect a sintering thereof, the compacting and sintering being effective to form and maintain the pieces of scrap metal as an integral unit with the longitudinally positioned scrap rods reinforcing the integral unit.

2. In the process of making an electrode for use as a consumable electrode in making titanium base alloy, the steps comprising, positioning pieces of scrap titanium base metal in rod form longitudinally within a steel pipe, filling the steel pipe with a mixture comprising a mixed size of scrap titanium base metal and crushed sponge titanium intermixed with alloying elements if additional alloying content is desired, sealing the filled pipe, heating the filled pipe to a temperature of 1700° F. to 1950° F., and working the filled pipe while at the temperature of 1700° F. to 1950° F. to compact the mixture and rods and effect a sintering thereof, the compacting and sintering being effective to form and maintain the mixture as an integral unit with the longitudinally positioned rods reinforcing the integral unit.

References Cited in the file of this patent

UNITED STATES PATENTS

| Number | Name | Date |
| --- | --- | --- |
| 936,403 | Von Bolton | Oct. 12, 1909 |
| 1,085,951 | Strohamenger | Feb. 3, 1914 |
| 2,123,416 | Graham | July 12, 1938 |
| 2,206,395 | Gertler et al. | July 2, 1940 |
| 2,234,127 | Mautsch | Mar. 4, 1941 |
| 2,287,951 | Tormyn | June 30, 1942 |
| 2,303,973 | Armstrong | Dec. 1, 1942 |
| 2,541,764 | Herres et al. | Feb. 13, 1951 |

OTHER REFERENCES

"The Melting of Molybdenum in the Vacuum Arc" (Tp 2052 Metals Technology, Sept. 1946), published in the Transactions A. I. M. E., vol. 171, pages 416–430. Pages 418, 426 and 427 are relied on.

"Sheath Working of Metal Powders," published as Report of Investigations 4464 by the U. S. Bureau of Mines, Feb. 1949. Pages 4 and 6 are particularly pertinent.

U. S. Air Force Project Rand Report R 131, March 15, 1949. Pages 52, 57 and 58 are relied on.

Bureau of Mines R. I. 4464 (of record). Pages 11–13 added to the record.

"Titanium," report of symposium, December 16, 1948, sponsored by ONR, Navy Dept., Wash., D. C. Pages 29 and 30 are relied on.